Aug. 26, 1958

W. W. HANNON 2,849,678

AUTOMATIC CIRCUIT CAPACITY MULTIPLYING APPARATUS
FOR ELECTRICAL CIRCUIT ANALYZER

Filed Jan. 9, 1956

INVENTOR.
Warren W. Hannon
BY
ATTORNEY.

INVENTOR.
Warren W. Hannon
BY
ATTORNEY.

INVENTOR.
Warren W. Hannon

INVENTOR.
Warren W. Hannon
BY
ATTORNEY.

United States Patent Office 2,849,678
Patented Aug. 26, 1958

2,849,678

AUTOMATIC CIRCUIT CAPACITY MULTIPLYING APPARATUS FOR ELECTRICAL CIRCUIT ANALYZER

Warren W. Hannon, Olathe, Kans., assignor to Dit-Mco, Inc., Kansas City, Mo., a corporation of Missouri Application January 9, 1956, Serial No. 558,056

5 Claims. (Cl. 324—73)

This invention relates generally to the field of electrical circuit testing equipment, such as is used in testing a large plurality of external circuits for continuity, resistance, inter-conductor resistance or the like, and more particularly to apparatus for substantially increasing the circuit handling capacity of an electrical circuit analyzer adapted for testing a predetermined, limited plurality of external circuits.

Still more specifically, the present invention relates to apparatus for multiplying the circuit handling capacity of an electrical circuit testing analyzer such as the one disclosed in my co-pending application Serial No. 472,487 entitled "Electrical Circuit Analyzer" and filed December 1, 1954. Although the principles of the present invention, as well as its essential structural characteristics, would have utility with various types of electrical circuit testing analyzers, for clarity and convenience the present invention is described in connection with an illustrative embodiment thereof which is particularly adapted for use with and direct coupling to the electrical circuit analyzer disclosed in my said co-pending application. It will, accordingly, be helpful in most readily comprehending the full significance of various features of the present invention to consider the following description of the present invention in conjunction with the disclosure of the electrical circuit analyzer described in my said co-pending application, certain terminal parts of the latter being illustrated in the accompanying drawings to facilitate a complete understanding of the manner in which the structure of the present invention is adapted to cooperate with an electrical circuit analyzer such, for instance, as the one described in my said co-pending application.

It may be noted that such electrical circuit analyzers normally include connecting means adapted to have a predetermined maximum of normally closed external circuits coupled therewith, means for applying an electrical voltage through the connecting means across a first of said external circuits, detecting, measuring or testing means coupled with said connecting means for determining the characteristics of the external circuit to which the voltage is being applied, automatic switching means for switching the voltage applying means and testing means successively from said one external circuit to each of the others in turn, and fault detecting means coupled with the testing means and switching means for halting the action of the latter when the testing means detects characteristics in a particular external circuit which are contrary to or outside of predetermined limiting conditions. The circuit handling capacity of such an analyzer will normally be somewhere in the range of a few hundred external circuts, a commercial embodiment thereof now manufactured and available on the market from DIT–MCO, Inc. of Kansas City, Missouri, having a capacity for handling and testing up to 200 external circuits. It may be observed that practical considerations of providing space and instrumentation for display of testing results embodies a preferential limit on the circuit handling capacity of an analyzer at somewhere around the figure mentioned, particularly where the analyzer is to be provided as a portable or semi-portable instrument. Heretofore, it has been necessary in checking the wiring of an airplane or the like having a great plurality of circuits in excess of the number which may be handled by any available analyzer to couple one sub-group of such circuits to the analyzer, test the same and then uncouple them and couple a next sub-group of said circuits to the analyzer for testing, with the process being repeated until all of the circuits have been tested.

It is the primary object of this invention to provide apparatus cooperable with such circuit testing analyzers and adapted for coupling thereto by which a plurality of groups of external circuits, each equal in number essentially to the maximum circuit handling capacity of the analyzer, may be automatically and successively tested by the latter without the necessity of substitution of couplings during the testing process. For example, the apparatus of this invention would permit an analyzer having a circuit handing capacity of 200 external circuits to test in one operation essentially some integer product of such analyzer capacity, for instance, 800 (actually 796 in a preferred embodiment of this invention) external circuits.

It is another important object of this invention to provide such apparatus wherein various groups of external circuits each essentialy equal in number to the circuit handling capacity of the analyzer will be successively and automatically connected with the analyzer as and responsive to the action of the analyzer in completing its testing upon the last to be tested of the external circuits in any of said groups thereof.

It is another important object of the invention to provide such apparatus having means adapting the same for use in testing a number of so-called "multiple circuits," that is, pluralities of circuits having one or more interconnections therebetween.

It is another important object of the invention to provide such apparatus having means therein permitting the energization of relays or other devices which may be associated with external circuits under test by means of energizing voltages originating at the analyzer, it being understood that typical external circuits for test may consist of simply a closed conductor having a small finite resistance or such a conductor having one or more sets of relay switch contacts interposed in series therewith or the like.

For simplicity of illustration and description, as well as so that the disclosure of this invention might correspond exactly with the embodiment of electrical circuit analyzer disclosed in my co-pending application, the invention is illustrated and described in terms of apparatus adapted for use with an analyzer having a normal circuit handling capacity of 12 external circuits and which is designed for increasing the overall testing capacity of such analyzer to 44 circuits. Actually, the invention may be designed for handling any other practicable number of external circuits for use with an analyzer having any particular maximum circuit handling capacity. However, the multiplying factor of essentially 4 to 1, that is, an increase of the total external circuits handleable by the apparatus to 4 times that handleable by the analyzer alone has been found particularly advantageous and is currently preferred. This is especially so since the present invention contemplated and has for another of its important objects the provision of apparatus as above-mentioned which is adaptable for use in pluralities connected in tandem with each other to further increase the overall circuit handling capacity of the analyzer and multiplier apparatus equipment. Thus, in a practical embodiment, the analyzer might have a maximum capacity of 200 circuits and be used with 3 multiplier apparatuses each having a capacity of 799 circuits to provide an overall effective capacity of 2,397 circuits which could be tested by the analyzer without the necessity of any recoupling. More or less of the multiplier apparatuses could obviously be connected in tandem to provide different overall capacities. In terms of the mentioned example, the embodiment described for purpose of illustration would comparably involve 3 multiplier apparatuses each having a circuit handling capacity of 44 circuits for use with an analyzer itself having, when used alone, a maximum capacity of 12 circuits.

Still other important objects of the invention will be made clear or become apparent as the following description of an illustrative embodiment of the invention progresses.

The accompanying drawings consist of 5 sheets, compositely illustrating a complete schematic diagram of a working embodiment of the invention which, however, as above noted, has been reduced as to the number of circuits illustrated for clarity in the drawings and simplification of the explanation (which would otherwise necessarily include much undue repetition). Each of the sheets of drawings carries a sub-figure designation, same being respectively Fig. 1A, Fig. 1B, Fig. 1C, Fig. 1D and Fig. 1E.

Figure 1A:
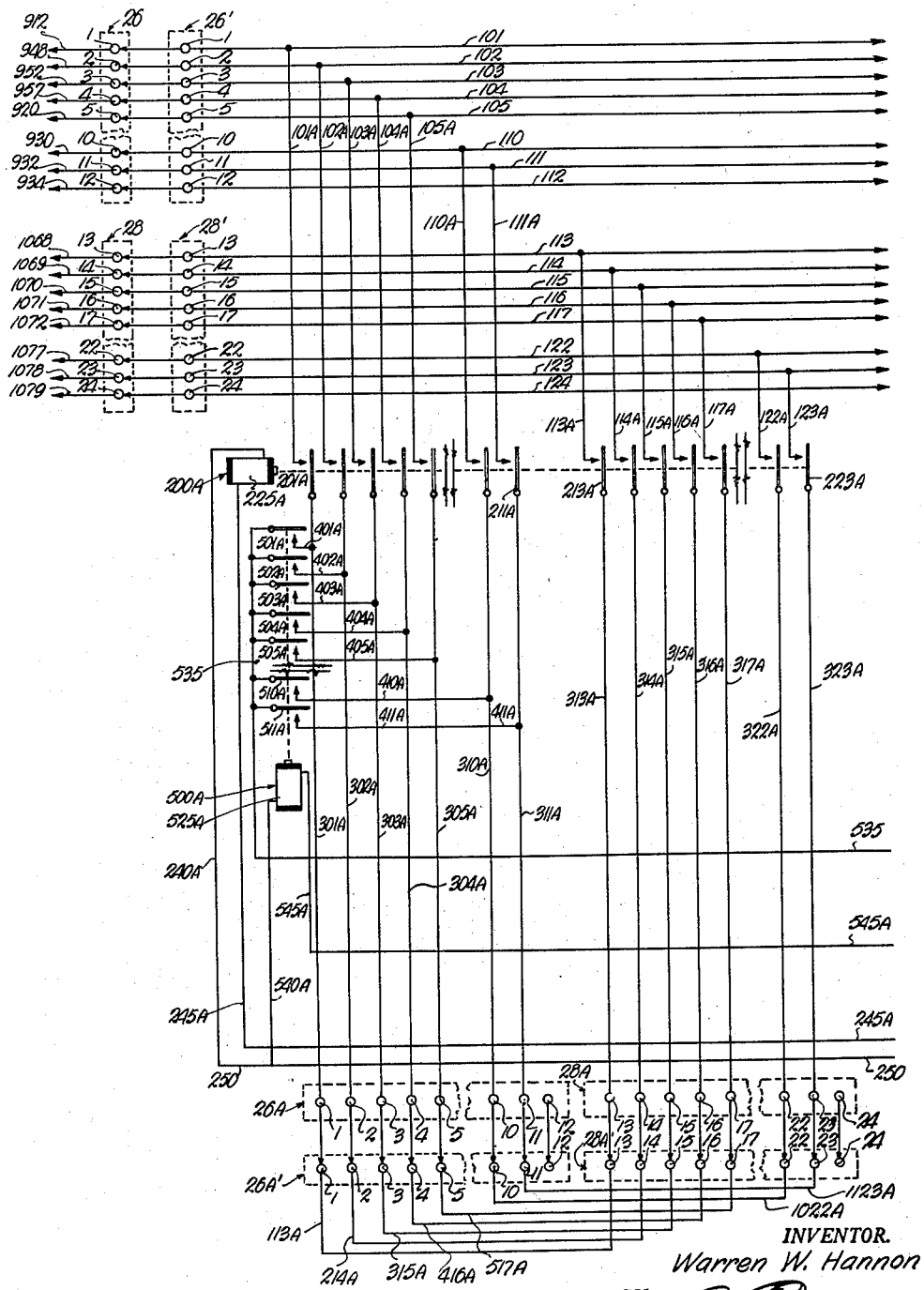
Fig. 1A illustrates that part of the circuitry of the apparatus which is adapted for coupling with the analyzer and that portion thereof which is particularly related to the first group of external circuits to be connected to the apparatus.
Figure 1B:
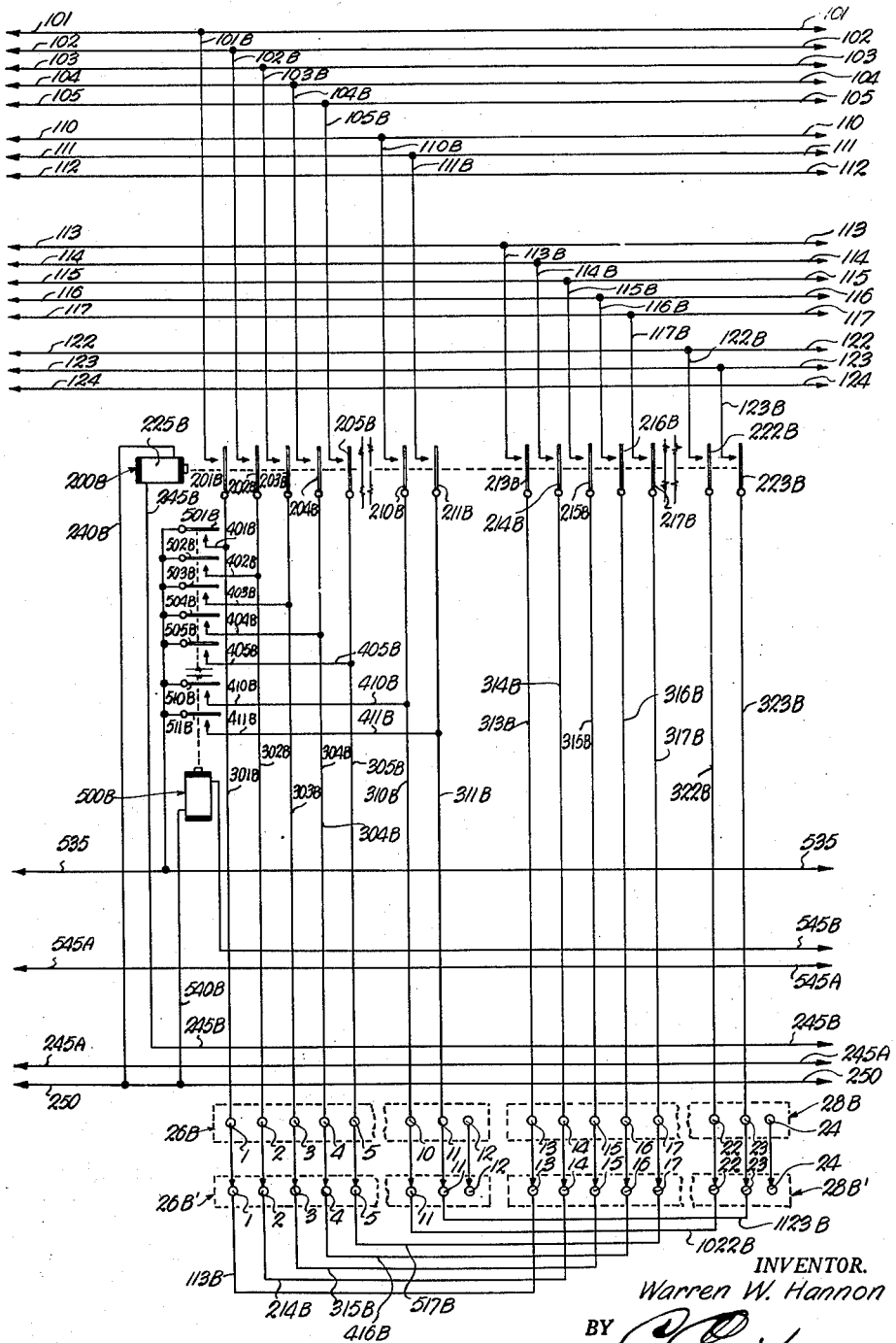
Fig. 1B illustrates that part of the circuitry of the apparatus which is particularly related to the second group of external circuits to be connected to the apparatus.
Figure 1C:
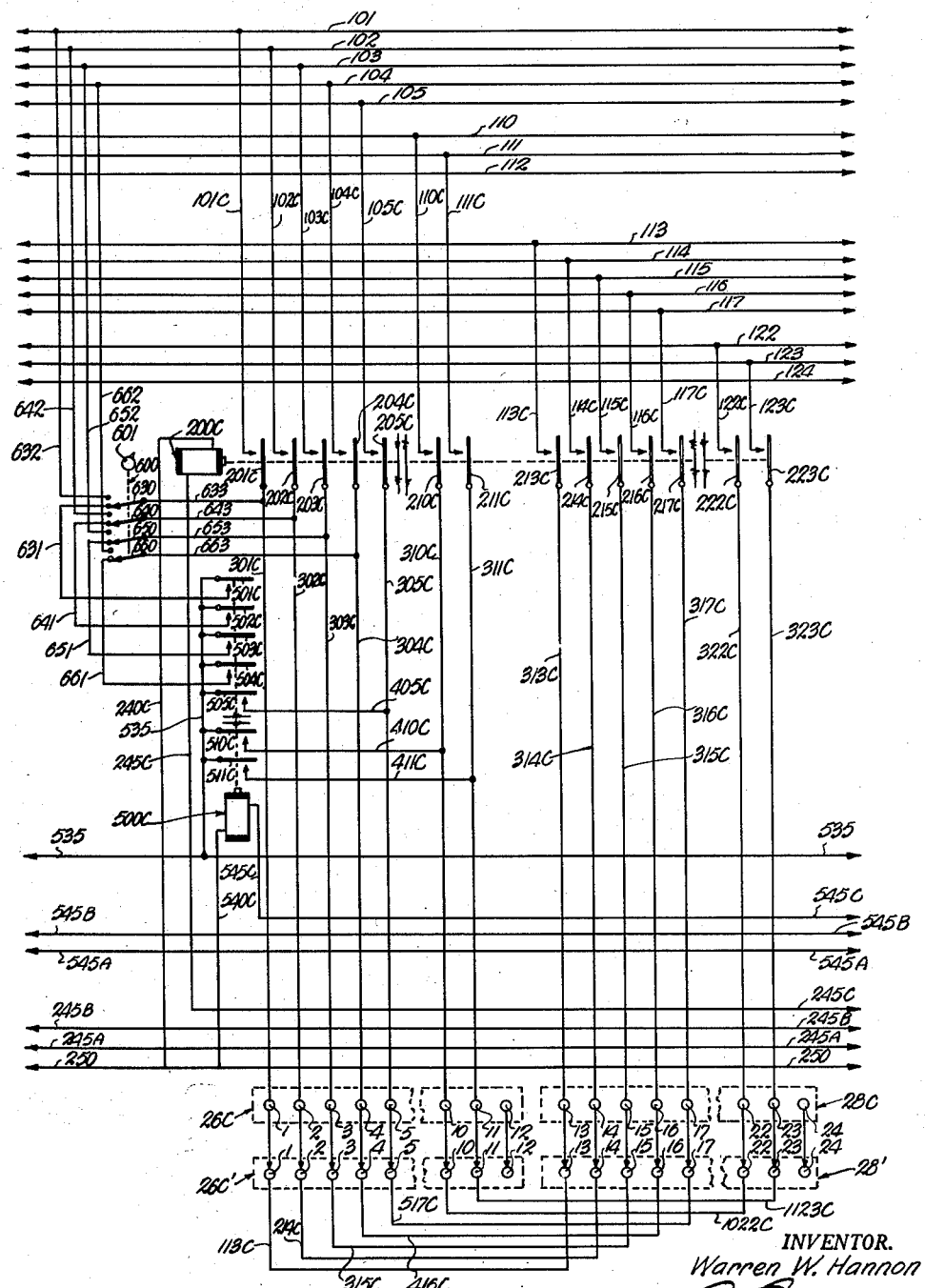
Fig. 1C illustrates that part of the circuitry of the apparatus which is particularly related to the third group of external circuits to be connected to the apparatus and by which provision is made in the apparatus for the handling of "multiple circuits" to be tested.
Figure 1D:
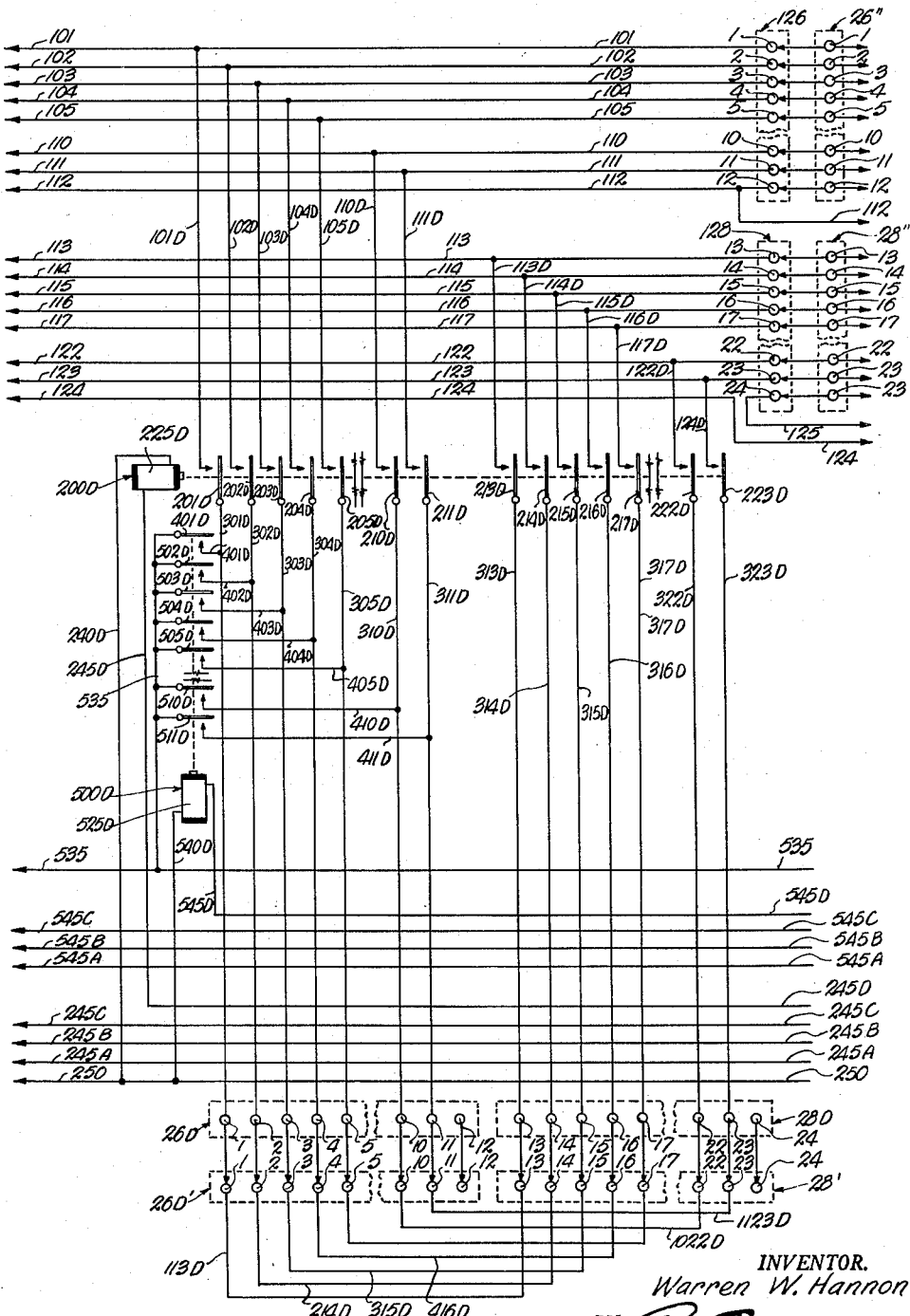
Figure 1E:
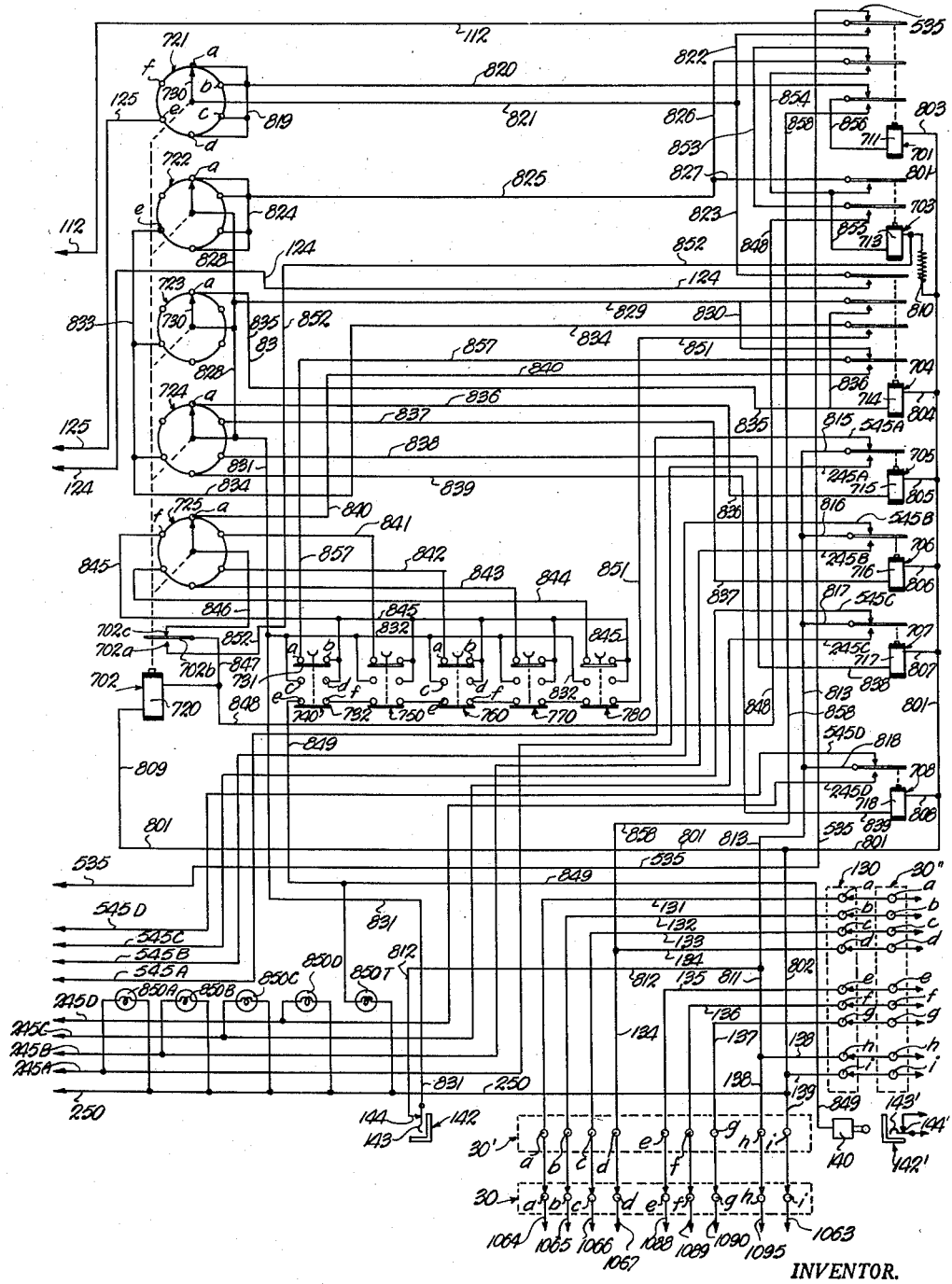

Fig. 1D illustrates that part of the circuitry of the apparatus which is particularly related to the fourth group of external circuits to be connected to the apparatus and also includes a portion of that part of the circuitry by which it is adapted to be coupled in tandem with a succeeding apparatus of similar construction; and Fig. 1E illustrates the control portion of the circuitry and the remaining portion of that part of the circuitry which is adapted for coupling with a succeeding, tandem connected apparatus of similar type.

Referring now to the drawings the numeral 26 (Fig. 1A) generally indicates one or more receptacles, terminal boards or the like forming a part of the analyzer with which the apparatus of this invention is to be used, such receptacle 26 corresponding exactly with the receptacle 26 disclosed in my said co-pending application. The receptacle 26 chosen for illustration has 12 terminals numbered successively from 1 to 12 inclusive, certain of such terminals being omitted from the drawing to avoid repetition. The conductors 912, 948, 952, 957, 920, * * * 930, 932 and 934 respectively coupled with terminals 1–12 inclusive of receptacle 26 being the same and corresponding with the similarly numbered conductors of my said co-pending application. It will be understood that normally the input end of a separate external circuit is coupled with each of terminals 1–12 inclusive of receptacle 26 in the analyzer and that an electrical voltage is successively applied to each of terminals 1–12 inclusive of receptacle 26 for passage through the external circuit under test to the corresponding one of terminals 13–24 inclusive of another receptacle generally designated 28 and also forming a part of the analyzer. In analyzers of the type in question, the receptacle 26 is referred to as the "input receptacle" and the receptacle 28 as the "output receptacle," the voltage input to the external circuit under test being applied from the receptacle 26 then passing through the external circuit under test to the receptacle 28 from which it is carried by the corresponding one of conductors 1068–1079 inclusive respectively connected with terminals 13–24 inclusive of receptacle 28 to the means (not shown) within the analyzer for ascertaining the characteristics of the external circuit under test from the current delivered to the receptacle 28 after passage through the external circuit. It may be noted that the numbering of receptacle 28 and the conductors 1068–1079 inclusive coupled therewith also correspond exactly with the similarly numbered elements in my said co-pending application.

Similarly, there is illustrated a receptacle generally designated 30 (Fig. 1E) having terminals $a$–$i$ inclusive, which is the multiple circuit energizing receptacle of similar number forming a part of the analyzer disclosed in my said co-pending application. Respectively coupled with the terminals $a$–$i$ inclusive of receptacle 30 of the analyzer are conductors 1064, 1065, 1066, 1067, 1088, 1089, 1090, 1095 and 1963, which are also numbered to correspond with the comparable conductors forming a part of the analyzer of my said co-pending application. It may be observed that terminal $h$ of receptacle 30 carries a positive supply voltage, such as 28 volts, and that terminal $i$ of receptacle 30 constitutes the common ground or negative connection for such positive supply voltage supplied to terminal $h$ of receptacle 30.

Receptacles 26, 28 and 30 and the conductors associated therewith illustrate the only parts of an analyzer which need be specifically shown for an understanding of the present invention, in view of the disclosure of my said copending application, which is hereby incorporated herein by reference for the purpose of explaining the operations inherent in an analyzer such as the apparatus of the present invention is to be used with.

A plug generally designated 26' (Fig. 1A) forms a part of the apparatus for this invention and is provided with pins 1–12 inclusive respectively cooperable with pins 1–12 inclusive of receptacle 26 of the analyzer to provide corresponding electrical connections therebetween when the apparatus of this inventon is coupled with and being used in conjunction with an analyzer. Similarly, this apparatus includes a plug 28' having pins 13–24 inclusive respectively cooperable with the corresponding numbered pins of receptacle 28 of the analyzer. Likewise, a plug 30' (Fig. 1E) is provided as a part of this apparatus and has pins $a$–$i$ inclusive respectively engageable with the correspondingly designated terminals of receptacle 30 of the analyzer.

Pins 1–11 inclusive of plug 26' (Fig. 1A) are respectively coupled by conductors 101–111 inclusive with terminals 1–11 of a tandem connector receptacle 126 (Fig. 1D) forming a part of the apparatus. There is no connection to terminal 12 of receptacle 126. Pin 12 of plug 26' is coupled with a conductor 112 extending into the control circuit shown in Fig. 1E and whose termination will be hereinafter further described. Similarly, pins 13–23 inclusive of plug 28' (Fig. 1A) are respectively coupled by conductive means 113–123 inclusive with terminals 13–23 inclusive of a tandem connector receptacle 128 (Fig. 1D). In Fig. 1D plugs corresponding to plugs 26' and 28' (Fig. 1A) of a second multiplier unit as contemplated by the invention are illustrated and designated by the numerals 26" and 28". Such plugs 26" and 28" of a second multiplier unit will be plugged into receptacles 126 and 128 of the first multiplier unit or one coupled with the analyzer only when more than one of the units is being utilized in tandem. Where more than two units are used in tandem comparable plugs 26" and 28" of successive units are plugged into the receptacles 126 and 128 of the preceding unit. Pin 24 of plug 28' is coupled with a conductor 124 which extends into the control circuitry shown in Fig. 1E and whose termination will be hereinafter more fully described. Also, the terminal 24 of receptacle 128 is coupled with a conductor 125 which extends into the control portion of the circuitry of the apparatus illustrated in Fig. 1E.

In like manner, each unit of multiplier apparatus is provided with an external energization output receptacle 130 (Fig. 1E) provided with terminals *a–i* inclusive, which are respectively connected with the correspondingly lettered terminals of plug 30' by conductive means 131–139 inclusive. The second unit of multiplier apparatus will have its plug corresponding to plug 30', which is designated 30", plugged into and cooperating with the receptacle 130 of the preceding multiplier apparatus unit when a plurality of same are being operated in tandem.

Each multiplier apparatus unit is also provided with a phone jack plug 140 (Fig. 1E) and a phone jack generally designated 142 (Fig. 1E) having a pair of normally closed contacts 143 and 144, the former of which is adapted for electrical contact with the phone jack plug 140 of a preceding unit when a plurality of units are connected in tandem. In Fig. 1E, the phone jack of a second, tandem connected unit is designated by the numeral 142'. The phone plug 140 of the first unit which is directly connected to the analyzer is not used, it being understood that such jack plugs 140 are utilized only to plug into a succeeding, tandem connected unit, if there be such.

Each multiplier unit is provided with an external circuit coupling plugs 26A and 28A respectively provided with pins 1–12 inclusive and 13–24 inclusive. Plugs 26A and 28A are adapted for coupling with receptacles 26A' and 28A', which are respectively provided with terminals 1–12 inclusive and 13–24 inclusive. Receptacles 26A' and 28A' are in turn adapted to have a plurality of external circuits coupled therebetween, such units being illustrated and designated as 113A, 214A, 315A, 416A, 517A, * * * 1022A and 1123A, it being observed that external circuit 113A is coupled between pin 1 of receptacle 26A' and terminal 13 of receptacle 28A', circuit 214A is coupled between pin 2 of receptacle 26A' and terminal 14 of receptacle 28A', etc. Although the external circuits 113A etc. are illustrated as straight and uninterrupted conductors, which would have some small finite resistance, it will be understood that they may include various lumped impedance elements or switch contacts whose opening or closing may comprise one of the conditions with respect to which the external circuitry must be tested.

Similarly, in Fig. 1B is illustrated a pair of external circuit coupling plugs 26B and 28B respectively adapted to connect with receptacles 26B' and 28B' to which are in turn coupled a plurality of external circuits 113B, 214B, 315B, etc. In like manner, there are provided in Fig. 1C plugs 26C and 28C, cooperating receptacles 26C' and 28C', and a plurality of external circuits 113C, 214C, etc., there also being provided in Fig. 1D comparable plugs 26D and 28D, receptacles 26D' and 28D', and external circuits 113D, 214D, etc. It may be observed that any desired number of sets of plugs such as 26A and 28A and receptacles such as 26A' and 28A' can be provided for accommodating sets of external circuits such as 113A, 214A, etc., 4 sets thereof respectively identified by the suffix letters A, B, C and D being selected for illustrative purposes herein. It will also be noted that the number of external circuits in each set thereof such as 113A, 214A, etc., will preferably be one less than the number of terminals provided on receptacles 26 and 28 of the analyzer, in order that one of the terminals 12 on analyzer input plug 26 and one of the terminals 24 on analyzer output plug 28 may be retained for accommodating control circuitry hereinafter to be described.

Referring again particularly to Fig. 1A, there are provided two relays generally designated 200A and 500A. The relay 200A has an operating coil 225A and a number of normally open, single pole, single throw relay switches 201A–211A inclusive and 213A–223A inclusive, each adapted to be closed when the coil 225A is energized. Similarly, relay 500A includes an operating coil 525A and a number of normally open, single pole, single throw relay switches 501A–511A inclusive, each adapted to be closed when the coil 525A is energized.

Conductor 101 is coupled through a conductor 101A, relay switch 201A and a conductor 301A with pin 1 of plug 26A. Similarly, each of conductors 102–111 inclusive are connected through conductors 102A–111A inclusive, relay switches 202A–211A inclusive and conductors 302A–311A inclusive with pins 2–11 respectively of plug 26A. Conductors 113–123 are respectively coupled through conductors 113A–123A inclusive, relay switches 213A–223A inclusive and conductors 313A–323A inclusive with pins 13–23 inclusive respectively of plug 28A. Conductors 301A–311A inclusive are respectively coupled through conductors 401A–411A and relay switches 501A–511A inclusive to a conductor 535. Relay coil 225A is coupled with a common ground conductor 250 by means of a conductor 240A and also has an opposite conductor 245A coupled therewith. Similarly, coil 525A is coupled with ground conductor 250 through a conductor 540A and also has a conductor 545A coupled therewith.

In like manner, in Fig. 1B, there are provided a pair of relays 200B and 500B in all respects corresponding to relays 200A and 500A and connections are provided identical with those described for Fig. 1–A and which are similarly numbered but provided with the suffix letter "B." Moreover, Fig. 1D is provided with corresponding relays 200D and 500D and with connections equivalent to those described in connection with Fig. 1A including the numbering thereof, except that the suffix letter "D" is substituted for the letter "A" used in connection with the various conductors and elements described for Fig. 1A. It should be noted that in a practical embodiment each of the relays 200A, 200B and 200D and the relays 500A, 500B and 500D will have to be capable of handling the switching for a number of conductors or circuits greater than the number of contacts usually provided on commercially available relays. It is, therefore, to be understood that each of such relays may, and as a practical matter preferably will, comprise either a bar type relay having a great number of available contacts or a number of conventional relays having their operating coils connected in parallel. Those skilled in the art will recognize that this matter involves purely design considerations which may be taken care of in any of several fashions.

In Fig. 1C there is provided a relay generally designated 200C and a relay generally designated 500C which are in all respects comparable to the relays 200A and 500A. Similarly, each of conductors 101–111 inclusive is respectively coupled through conductors 101C–111C inclusive, relay switches 201C–211C inclusive, and conductors 301C–311C inclusive with pins 1–11 inclusive of plug 26C. Also, each of conductors 113–123 inclusive is respectively coupled through conductors 113C–123C inclusive, relay switches 213C–223C inclusive and conductors 313C–323C inclusive with pins 11–23 inclusive respectively of plug 28C. Moreover, each of conductors 305C–311C inclusive is respectively coupled through conductors 405C–411C inclusive and relay switches 505C–511C inclusive with the conductor 535. However, there is provided a manually operable, multiple circuit operation controlling switch generally designated 600 having a control knob 601 and a plurality of single pole, double throw, ganged switches identifiable by their shiftable pole pieces 630, 640, 650 and 660. Pole pieces 630, 640, 650 and 660 are respectively coupled with conductors 101C, 102C, 103C and 104C through conductors 633, 643, 653 and 663. Pole piece 630 is normally in contact with the termination of a conductor 631 leading through relay switch 501C to the conductor 535, but is shiftable into electrical coupling with a conductor 632 connected with conductor 101. Pole piece 640 normally engages a terminal end of a conductor 641 leading through relay switch 502C to conductor 535, but is shiftable into electrical coupling with a conductor 642 connected with conductor 102. Pole piece 650 normally engages the terminus of a conductor 651 leading through a relay switch 503C to conductor 535, and is shiftable into contact with a conductor 652 connected with conductor 103. Similarly, pole piece 650 normally couples electrically with a conductor 661 leading through relay switch 504C to conductor 534, but is shiftable into electrical connection with a conductor 662, which is in turn connected with conductor 105. The operation of the switch 601 and its effect upon the functioning of the apparatus of the invention as to the testing of so-called "multiple circuits" will hereinafter be more fully explained, it being observed that a greater or lesser number of pole pieces 630, 640, and 660 could have been provided in association with more or less of the conductors 101, 102, 103 et seq. Since the disclosure of my said co-pending application was in illustrative terms of accommodating multiple circuits on up to 4 of the input terminals of plug 26, however, only 4 of such pole pieces 630 etc. have been illustrated on the switch 601 for the sake of consistency.

It may now be observed that the structure shown in each of Figs. 1A, 1B, 1C and 1D respectively, constitutes, in essence, a separate multiplier "section" of the unit or apparatus contemplated by the invention. For convenience, such portions of the circuitry will hereinafter sometimes be referred to broadly as sections A, B, C, and D respectively.

Referring now more particularly to Fig. 1E and the control circuitry therein illustrated, it will be seen that there are provided a number of relays 701, 703, 704, 705, 706, 707 and 708 and a stepping switch broadly designated by the numeral 702. In order to avoid undue congestion of the drawing, no identifying numerals or letters will be placed on each of the contacts of the various switches associated with said relays; rather, the contacts and poles of such switches will be hereinafter described with the contacts and poles thereof designated by the numeral of the relay and a small case letter such as *a*, *b*, et seq. with such lettering commencing with the contact or pole piece furthest removed from the coil of the relay and proceeding in sequence as the coil of the relay is approached.

Thus, relay 701 includes a coil 711; a first single pole, double throw switch consisting of a pole piece *b* normally in engagement with a stationary contact *a* and shiftable into engagement with a stationary contact *c* when the coil 711 is energized; a second single pole, double throw switch consisting of a swingable pole piece *e* normally in engagement with a stationary contact *d* and swingable into engagement with a stationary contact *f* when the coil 711 is energized; and a third single pole, double throw switch consisting of a pole piece *h* normally in engagement with a stationary contact *g* and shiftable into engagement with a stationary contact *i* when the coil 711 is energized. Similarly, relay 703 includes a coil 713; a first, normally open, single pole, single throw switch consisting of a swingable pole piece *a* and a stationary contact *b*, pole piece *a* being adapted to engage contact *b* when coil 713 is energized; and a second, normally open, single pole, single throw switch consisting of a swingable pole piece *d* and a stationary contact *e*, pole piece *d* being adapted to engage contact *e* when coil 713 is energized. Relay 704 includes a coil 714; a first, normally open, single pole, single throw switch consisting of a swingable pole piece *a* adapted to engage a stationary contact *b* when coil 714 is energized; a second, normally open, single pole, single throw switch consisting of a swingable pole piece *c* adapted to engage a stationary contact *d* when the coil 714 is energized; a third, normally open, single pole, single throw switch consisting of a swingable pole piece *e* adapted to engage a stationary contact *f* when the coil 714 is energized; and a single pole, double throw switch consisting of a single pole piece *h*, normally in engagement with a stationary contact *g* and adapted to swing into engagement with a stationary contact *i* when the coil 714 is energized. Relay 705 includes a coil 715 and a single pole, double throw switch consisting of a swingable pole piece *b* normally in engagement with a stationary contact *a* and adapted for engagement with a stationary contact *c* when the coil 715 is energized. Relay 706 includes a coil 716 and a single pole, double throw switch consisting of a swingable pole piece *b* normally in engagement with a stationary contact *a* and adapted for engagement with a stationary contact *c* when the coil 716 is energized. Relay 707 includes a coil 717 and a single pole, double throw switch consisting of a swingable pole piece *b* normally in engagement with a stationary contact *a* and adapted for engagement with a stationary contact *c* when the coil 717 is energized. Relay 708 includes a coil 718 and a single pole, double throw switch consisting of a swingable pole piece *b* normally in engagement with a stationary contact *a* and adapted for engagement with a stationary contact *c* when the coil 718 is energized.

The stepping switch assembly 702 includes an operating magnet coil 720 and 5 ganged switch banks generally designated 721, 722, 723, 724 and 725, each including a shiftable contact arm or pole piece 730 and 6 stationary contacts *a*, *b*, *c*, *d*, *e* and *f* adpated to be successively engaged by the arm 730 thereof. In referring to same hereinafter, the contacts will be identified by the numeral designating the particular switch bank and the letter designating the particular contact of such bank, for instance, 721*a*, 721*b*, 722*d*, 725*f*, etc. Stepping switch assembly 702 also includes a single pole, double throw interrupter switch having a swingable pole piece 702*b* normally in engagement with a stationary contact 702*a* and adapted for engagement with a stationary contact 702*c* whenever the coil 720 is in enregized condition.

Also provide are 5 push button type switches generally designated 740, 750, 760, 770 and 780. Each of such switches 740, 750 et seq. includes 6 stationary contacts identified by the numeral of the switch and the letters *a*, *b*, *c*, *d*, *e* and *f*, the first shiftable pole piece 731 normally in bridging engagement with contacts *a* and *b* of the corresponding switch and shiftable to a position bridging contacts *c* and *d* thereof, and a shiftable pole piece 732 normally in bridging engagement with contacts *e* and *f* and simultaneously shiftable with the pole piece 731 to a position clearing contacts *e* and *f*.

Conductor 250 is coupled through conductor 139 with pin *i* of plug 30', thereby grounding the same. A further grounded conductor 801 is coupled with pin *i* of plug 30' through a conductor 802 and conductor 139. Coils 711, 714, 715, 716, 717 and 718 are grounded to conductor 801 through conductors 803, 804, 805, 806, 807 and 808 respectively. Coil 713 is grounded to conductor 801 through a resistance element 810. Magnet coil 720 is grounded to conductor 801 through a conductor 809.

The positive voltage supply terminal *h* of plug 30' is coupled with the contact 144 of jack 142 through conductor 138, a conductor 811 and a conductor 812. A conductor 813 is energized from pin *h* of plug 30' through conductors 138 and 811. Relay switch poles 705*b*, 706*b*, 707*b* and 708*b* are coupled with power conductor 813 through conductors 815, 816, 817 and 818 respectively.

Conductors 245A, 245B, 245C and 245D are coupled respectively with relay switch contacts 705*c*, 706*c*, 707*c* and 708*c*. Conductors 545A, 545B, 545C and 545D are coupled respectively with relay switch contacts 705*a*, 706*a*, 707*a* and 708*a*. Conductor 535 is coupled with relay switch contact 701*a*. Conductor 112 is coupled with relay switch contact 701b. Conductor 125 is coupled with stepping switch contact 721e. Conductor 124 is coupled with relay switch contact 704b.

Stepping switch contacts 721a, 721b, 721c and 721d are coupled together by conductive means 819 and are coupled with relay switch contact 701g by a conductor 820. Arm 730 of stepping switch bank 721 is coupled by conductors 821 and 822 with relay switch contact 701c and by conductors 821 and 823 with relay switch contact 704a. Stepping switch contacts 722a, 722b, 722c and 722d are coupled together by conductive means 824 and are connected with relay contact 701e through conductors 825 and 826 and through conductors 825 and 827 with relay contact 703a. Arms 730 of stepping switch banks 722, 723 and 724 are coupled together by conductive means 828 and in turn coupled with relay switch contact 704d through a conductors 829, with relay switch contact 704g through conductors 829 and 830, with contact 143 of jack 142 through a conductor 831 and with the contacts c of each of the push button switches 740, 750, 760, 770 and 780 through conductive means 832. Contacts e of each of stepping switch banks 722, 723 and 724 are coupled together by conductive means 833 and in turn coupled with relay switch contact 804e by a conductor 834.

Stepping switch contact 723 is coupled with relay coil 714 through a conductor 835 and with relay switch contact 714d through conductor 835 and a conductor 836. Stepping switch contacts 724a, 724b, 724c and 724d are respectively coupled with relay coils 715, 716, 717 and 718 through conductors 836, 837, 838 and 839. Stepping switch contact 725a is coupled with relay switch contact 704i through a conductor 840. Stepping switch contacts 725b, 725c, 725d and 725e are respectively coupled with push button switch contacts 750a, 760a, 770a and 780a by conductors 841, 842, 843 and 844. Stepping switch contact 725f is coupled with the b and d contacts of each of push button switches 740, 750, 760, 770 and 780 by conductive means 845. Arm 730 is coupled with stepping switch interrupter switch contact 702c by a conductor 846. Interrupter switch contact 702a is coupled with the side of relay coil 713 connected to resistance 810 by a conductor 852.

The ungrounded side of stepping switch operating coil 720 is coupled with interrupter switch contact 702b through a conductor 847 and with relay switch contact 703d through a conductor 848. A number of indicating lamps 850A, 850B, 850C and 850D are coupled between ground conductor 250 and conductors 245A, 245B, 245C and 245D respectively. A fifth indicating lamp 250T is coupled between ground conductor 250 and a conductor 849 coupling jack plug 140 with push button switch contact 740e. Push button switch contact 740f is coupled with contact 750e, contact 750f with contact 760e, 760f with 770e, 770f with 780e, and push button contact 780f to relay contact 704f through a conductor 851.

Relay contact 701d is coupled with relay contact 703c by a conductor 853. Relay contact 701f is coupled with relay contact 703b by a conductor 854 and with relay coil 713 through conductor 854 and a conductor 855. Relay contact 701h is coupled with the ungrounded side of relay coil 710 to which resistance 814 is connected by a conductor 856. Relay contact 701i is coupled with pin d of plug 30' through a conductor 858 and conductor 134. Relay contact 704h is coupled with push button switch contact 740a by a conductor 857.

Having thus set forth the structural aspects and elements of an illustrative embodiment of apparatus made in accordance with the invention, its operation may now be described.

Operation

It should initially be observed that all operating power for the apparatus of this invention is derived from the analyzer with which it is used, the pins h and i of receptacle 30 constituting, whenever the analyzer is itself energized for normal operation, a steady source of preferably direct current electrical power of voltage of the order, for instance, of 28 volts or the like, suitable for operating the relays 200A, 200B, 200C, 200D, 500A, 500B, 500C and 500D, the relays 701, 703, 704, 705, 706, 707 and 708, and the stepping switch operating coil 702 (pin h being the positive one and pin i being the negative or grounded one). Alternately, of course, an independent source of operating voltage for the apparatus could be provided and coupled with pins h and i of plug 30'.

It is also to be understood that the analyzer with which the apparatus of this invention is to be used should be adapted to deliver a positive voltage suitable for operating the relay 701 to terminal d of receptacle 30 whenever the analyzer is in its last test position, that is, the one of its sequential circuit testing positions corresponding with terminals 12 and 24 of receptacles 26 and 28 respectively of the analyzer disclosed in my said co-pending application and referred to herein for explanatory purposes, and for automatically withdrawing such energization from terminal d of receptacle 30 when the analyzer leaves such last test position and advances to the first test position for commencing a new sequence of tests; in the analyzer disclosed in my said co-pending application, this is accomplished through the contact D of stepper switch bank 65 thereof.

It is further to be understood that the analyzer with which the apparatus of this invention is to be used should include energizing means for applying a positive direct current voltage of magnitude suitable for testing external circuits to any of the terminals of receptacle 28 (that is, to any of terminals 13-24 inclusive in the illustrative embodiment); continuity verifying means adapted for coupling with any of the terminals of receptacle 26 (that is, to terminals 1-12 of the illustrative embodiment); for determining the existence of continuity through an external circuit or the like coupled between any energized terminal of receptacle 26 and the corresponding terminal of receptacle 28; switching means for automatically and successively coupling said energizing means and said verifying means with each corresponding pair of terminals of receptacles 26 and 28 in turn; short detecting means coupled with the last terminal of receptacle 26 (terminal 12 in the illustrated embodiment) for detecting any short or excessive leakage between any external circuit coupled with the terminal of receptacle 28 to which the test voltage is being applied and such last terminal of receptacle 26 or any external circuits coupled with the latter; and control means coupled with the switching means and adapted for coupling with said verifying means and/or detecting means for interrupting the further automatic operation of the latter whenever the continuity verifying means finds a lack of continuity in a circuit under test or the short detecting means finds a short or excessive leakage between such circuit test and the last terminal of receptacle 26. Although preferred forms of analyzers include both such continuity verifying means and such short detecting means, if not for simultaneous then for alternate utilization, it will be clear that the apparatus contemplated by this invention could be used to advantage even with analyzers providing only one or the other of such testing means.

It may also be noted that certain embodiments of analyzers provide for the use of higher testing voltage when the short test is the one of primary interest than when the continuity test is of principal significance; since such testing voltage is utilized in the apparatus of this invention for initial energization of the relay 701, when the apparatus is to be used with such dual test voltage it is advisable that some suitable arrangement be provided to accommodate the coil 711 of relay 701 for energization at either voltage level, one satisfactory method adapted to relatively wide voltage differences being to use a so-called "plate relay" having a coil operable with widely varying voltages for the relay 701.

Finally, it is to be understood that the preferred type of analyzer with which the apparatus is to be used, either automatically upon energization of the power circuits thereof to arrive at readiness for regular testing operation or by virtue of appropriate manual adjustment, sets itself to the first of its sequential test positions.

With these general characteristics of the class of analyzers for which the present apparatus is particularly adapted for use in mind, the actual functioning of the apparatus contemplated by this invention and the significance thereof can be more readily understood and appreciated.

Assume that, with the power in the analyzer (and/or in a separate power source adapted for coupling to pins *h* and *i* and plug 30') turned off, the connections contemplated by the cooperative union of plug 26' with receptacle 26, plug 28' with receptacle 28', plug 30' with receptacle 30 and the various external circuits to be tested with plugs 26A, 26B, 26C and 26D have made; and further assume, first that only a single unit of capacity multiplier apparatus as contemplated by this invention is to be used with the analyzer. In such instance, none of plug 140, jack 142, receptacle 126 or receptacle 130 are in use. The case of tandem operation of a plurality of units of multiplier apparatus will be later discussed.

The apparatus always commences its operations with the arms 730 of stepping switch banks 721, 722, 723, 724 and 725 in their "home position" engaging contacts *a* thereof. If the arms 730 are in such "home position" when the analyzer and apparatus are energized, the latter is ready for immediate operation; if not, however, the apparatus automatically and virtually instantaneously resets the arms 730 to their "home positions" in the following manner.

Assume arms 730 are resting on contacts *b* of stepping switch banks 721 et seq. when the power for the analyzer and apparatus is initially turned on, a voltage is applied from positive pin *h* of plug 30', through conductors 138, 811, 812, closed contacts 144 and 143 of jack 142, conductors 831, 828, 829 and 830, closed relay contacts 704g and 704h, conductor 857, push button switch contact 740a, pole piece 731 of switch 740, contact 740b, conductor 845, contact 750b, pole piece 731 of switch 750, contact 750a, conductor 841, arm 730 of bank 725, conductor 846, interrupter switch contacts 702b and *c* (which are closed until coil 720 becomes energized), and conductor 847, thence through stepping switch coil 720 and conductors 809, 801, 802 and 139 to ground pin *i* of plug 30'. This energizes stepping coil 720. It may be observed that, up to this time, all of the relays 701, 703, 704, 705, 706, 707 and 708 remain deenergized.

Energization of coil 720 cocks the same for stepping the arms 730 to the next contact of banks 721 et seq. and simultaneously operates the interrupter switch to break the engagement between contacts 702b and 702c thereof, thereby breaking the above traced energizing circuit for coil 720 to deenergize the latter.

Deenergization of coil 720 steps the arms 730 into engagement with contacts *c* of banks 721 et seq. and permits interrupter contacts 702b and 702c to reclose.

Reclosure of interrupter contacts 702b and 702c remakes an energizing circuit for coil 720 substantially the same as that above traced except that, between conductor 845 and arm 730 of bank 725, the circuit proceeds through push button contact 760b, pole piece 731 of switch 760, contact 760a, conductor 842 and stepping switch contact 725c.

The opening and reclosing of interrupter contacts 702b and 702c repeats itself, with coil 720, upon deenergization thereof, moving the arms 730 into engagement with contacts D of banks 721 et seq.

The energizing circuit for coil 720 is then automatically and alternately reenergized and deenergized through the obvious variations through stepping switch contacts E and F and push button switches 770 and 780 until the arms 730 have been stepped into their "home position" in engagement with the contacts *a* of stepper switch banks 721 et seq. Since contact 725a has no connection with the traced energizing circuit for coil 720, the latter remains deenergized pending subsequent events to be described. As will be apparent, if the arms 730 were in their "home position" when the analyzer and apparatus were energized, the operation of the apparatus would start from this point.

When arms 730 of banks 723 and 724 come to their "home positions" coils 714 and 715 of relays 704 and 705 are respectively energized, the energizing circuits being traced from pin *h* of plug 30' through the same path as above for coil 720 up to the conductor 828, thence, respectively, through arm 730 of bank 723, contact 723a and conductor 835 to coil 714, through coil 714 and conductors 804, 801, 802 and 139 to ground pin *i* of plug 30' (for coil 714), and through arm 730 of bank 724, contact 724a and conductor 836 to coil 715, through coil 715 and conductors 805, 801, 802 and 139 to ground pin *i* of plug 30' (for coil 715).

Energization of coil 714 completes a holding circuit therefor running identically to the above traced energizing circuit for coil 720 up to conductor 829, thence through now closed relay switch contacts 704b and 704c and conductor 836 to coil 714, through coil 714 and conductors 804, 801, 802 and 139 to pin *i* of plug 30'.

Energization of coil 715 closes relay switch contacts 705b and 705c, thus completing an energizing circuit for relay coil 225A (Fig. 1A) traceable from positive pin *h* of plug 30', through conductors 138, 811, 813 and 815, relay switch contacts 705b and 705c, and conductor 245A (traversing Figs. 1B, 1C and 1D) to relay coil 225A, through coil 225A and conductors 240A, 250 (traversing Figs. 1B, 1C and 1D) and 139 to ground pin *i* of plug 30'. Indicating lamp 850A (Fig. 1E) is also energized through the obvious circuitry.

Energiztaion of relay coil 225A closes relay switches 201A–211A inclusive and 213A–223A inclusive, thereby connecting the external circuits coupled with plugs 26A and 28A to the apparatus plugs 26' and 28', and accordingly, the analyzer receptacles 26 and 28. For illustration, one end of the external circuit 113A is coupled with terminal 1 of receptacle 26 through pins 1 of receptacle 26A' and plug 26A respectively, conductor 301A, closed relay switch 201A, conductors 101A and 101, and pin 1 of plug 26', while the other end of external circuit 113A is coupled with terminal 13 of receptacle 28 through pins 13 of receptacle 28A' and plug 26A respectively, conductor 313A, closed relay switch 213A, conductors 113A and 113, and pin 13 of plug 28'.

It should now be noted that with the initial introduction of power to the apparatus, the relay coils 525B (Fig. 1B), 525C (Fig. 1C), and 525D (Fig. 1D) were energized by virtue of the deenergization of relay coils 716, 717 and 718 respectively (Fig. 1E). Actually the relay coil 525A (Fig. 1A) was also initially energized, but became deenergized upon the energization of coil 715 of relay 705 (Fig. 1E). The energizing circuitry for relay coil 525D is illustrative and may be traced from positive pin *h* of plug 30, through conductors 138, 811 and 813, normally closed relay contacts 708a and 708b, and conductor 545D to coil 525D, through coil 525D and conductors 540D, 250 and 139 to ground pin *i* of plug 30'.

With the apparatus in such condition, everything is ready for the sequential testing of the external circuits 113A to 1123A coupled with the A section by the analyzer, and the apparatus remains in status quo until the testing of said A section circuits is completed.

Presuming that external circuit 113A is found by the analyzer to have the required continuity and absence of a short or excessive leakage to any of the B, C and D section circuits which are commoned and coupled with terminal 12 of analyzer plug through the closed switches of relays 500B, 500C and 500D, conductor 535, normally closed relay switch contacts 701a and 701b, conductor 112 and pin 12 of plug 26', then the control means within the analyzer will switch the latter to its second test position at which external circuit 214A will be tested, and so on through all of the external circuits coupled with section A until the testing of circuit 1123A has been completed. The action of the analyzer when a fault is found in a circuit under test forms no part of the present invention and is fully discussed in my said copending application; accordingly, it need only be noted that the finding of a fault in a circuit under test stops the analyzer on the test position for such faulty circuit until certain actions have been taken at the analyzer having no direct bearing on the operation of the apparatus of this invention.

When the analyzer has completed the testing of circuit 1123A and advances to its last testing position, the positive testing voltage from the analyzer is applied to terminal 24 of receptacle 28, and thence through pin 24 of plug 28' and conductor 124, closed relay switch contacts 704b and 704a, conductors 823 and 821, arm 730 of stepping switch bank 721, bank contact 721a, conductors 819 and 820, normally closed relay switch contacts 701g and 701h, and conductor 856 to relay coil 711, then through coil 711 and conductors 803, 801, 802 and 139 to ground pin i of plug 30'. This obviously energizes coil 711 of relay 701.

Energization of relay coil 711 closes relay switch contacts 701e and 701f, thereby energizing coil 713 of relay 703 through a circuit traceable from pin h of plug 30' along the same path as above traced energizing circuit for stepping switch coil 720 as far as conductor 828, thence through arm 730 of bank 722, contact 722a, conductors 825 and 826, now closed relay switch contacts 701e and 701f, and conductors 854 and 855 to coil 713, through coil 713, resistance 810 and conductors 801, 802 and 139 to ground pin i of plug 30'.

Coil 713 is then held energized through a holding circuit traceable the same as the energizing circuit therefor, except that from conductor 825 the holding circuit proceeds to coil 713 through a conductor 827, now closed relay switch contacts 703a and 703b, and conductor 855, rather than through relay switch contacts 701e and 701f.

Energization of relay coil 711 also closes relay switch contacts 701b and 701c to provide internal (as compared with an external circuit) continuity between terminal 12 of receptacle 26 of the analyzer and terminal 24 of receptacle 28 thereof, the circuit being traceable from terminal 12 of receptacle 26, through pin 12 of plug 26', conductor 112, relay switch contacts 701b and 701c, conductors 822 and 823, still closed relay switch contacts 704a and 704b, conductor 124, and pin 24 of plug 28' to terminal 24 of receptacle 28.

The provision of such a continuity circuit between terminal 12 of receptacle 26 and terminal 24 of receptacle 28 causes the analyzer to reset itself to its first test position removing the test voltage from terminal 24 of receptacle 28 and applying the same to terminal 12 thereof.

Removal of the test voltage supplied by the analyzer from terminal 24 of receptacle 28 obviously deenergizes relay coil 711 permitting relay switch contacts 701d and 701c to return to their normally closed position.

Such reclosure of relay contacts 701d and 701c completes an alternate energizing circuit for stepping switch coil 720 traceable the same as the first above traced energizing circuit for said coil 720 as far as conductor 828, thence through arm 730 of bank 722, bank contact 722a, conductors 824, 825 and 826, now reclosed relay contacts 701c and 701d, conductor 853, still closed relay contacts 703c and 703d, and conductor 848 to coil 720, then through coil 720 and conductors 809, 801, 802 and 139 to ground pin i of plug 30'.

Energization of coil 720, of course, closes interrupter switch contacts 702b and 702a, applying the positive voltage above traced as existing on conductor 848 to the normally negative side of relay coil 713 through conductor 847, closed interrupter contacts 702b and 702a, and conductor 852 coupled with the side of coil 713 that is grounded through resistance 810. The resistance 810 thus permits an equal positive potential to be simultaneously applied to both sides of relay coil 713, neutralizing the action of the above traced holding circuit for coil 713 and accomplishing the deenergization of same.

Deenergization of coil 713 opens relay contacts 703c and 703d, thereby breaking the above traced alternate energizing circuit for stepping switch coil 720 and deenergizing the latter. Such deenergization of coil 720 steps the arms 730 away from their "home positions" into engagement with contacts b of banks 721 et seq.

Movement of arms 730 into engagement with contacts b of banks 721 et seq. readies the apparatus for the testing of the external circuits coupled with section B in the same general manner as just described for the cycling of the apparatus through the testing of the section A circuits. It may be noted, however, that during the testing of the circuits 113B, 214B, 315B, etc., the relay 200B is the only one of the relays 200A, 200B, 200C and 200D which is energized (through the contacts 706b and 706c), while all of the relays 500A, 500B, 500C and 500D, except 500B, are energized (through contacts 705a and 705b, 707a and 707b, and 708a and 708b, respectively). Energization of lamp 850B indicates that the apparatus has shifted to the external circuits coupled with section B.

The apparatus then successively shifts in the same general fashion described, as the analyzer reaches the last test position for each section, to the next section, until finally all of the external circuits coupled with all sections of the apparatus have been completely tested by the analyzer, the arms 730 of stepping switch banks 721 et seq. are all in engagement with the contacts d of the corresponding banks, and the analyzer has arrived at its last test position. As before, relays 701 and 703 are first successively energized in that order, then deenergized in such order, resulting in the energization then deenergization of stepping coil 720 and the shifting of arms 730 into engagement with the contacts c of banks 721 et seq. Since with the arms 730 in engagement with contacts e of banks 721 et seq. the relays 200A, 200B, 200C and 200D will all be deenergized, it is clear that no external circuits are coupled through the apparatus to receptacles 26 and 28 of the analyzer and that the analyzer will, therefore, remain in its first test position.

Moreover, the apparatus will remain in its status quo with arms 730 on contacts e of banks 721 et seq. Without the taking of further control steps by an operator, as hereinafter explained, the coil 720 cannot be reenergized through the energizing circuit therefor first above traced to move the arms 730 off of contacts e of banks 721 et seq., because of the continuing energization of relay coil 714 breaking relay contacts 704g and 704h disposed in series with such energizing circuit. Such holding of arms 730 on contacts c did not occur during initial indexing of arms 730 to the "home position" when the power was first turned on, since relay coil 714 was then deenergized and remained so until the arms reached their "home position" engaging contacts a of banks 721 et seq.

The above-mentioned holding circuit maintains the relay coil 714, once energized, in such condition until the power is turned off, such interrupting of the power constituting one method of re-indexing the arms 730 to their "home position." An alternate method of re-indexing the arms 730 from any position thereof to any other functional position thereof, including the "home position" or positions in engagement with either of the sets of bank contacts b, c, d or e, is provided by the manual push button switches 740, 750, 760, 770 and 780.

Assume, for instance, arms 730 are on bank contacts e and it is desired to advance same to their "home position," operation of push button switch 740 completes a first energizing circuit for coil 720 from positive pin h of plug 30', through conductors 138, 811 and 812, closed jack contacts 143 and 144, conductors 831 and 832, push button switch contact 740c, pole piece 731 of switch 740, contact 740d, conductor 845, switch contact 780b, pole piece 731 of switch 780, contact 780a, conductor 844, bank contact 725e, arm 730 of bank 725, interrupter contacts 702c and 702b, conductors 845 and 848, coil 720 and conductors 709, 801, 802 and 139 to ground pin i of plug 30'; and a second one identical to the first except that it proceeds from conductor 845 to arm 730 of bank 725 directly through bank contact 725f. The successive energization and interruption of coil 720 will occur in the same manner as above described until arm 730 of bank 725 reaches bank contact 725a, which is not energized, whereupon the stepping of arms 730 will stop at their desired home position. In general, operation of any of switches 740, 750, 760, 770 or 780 results in the deenergization of the corresponding contact of bank 725 and the energization of all other contacts thereof, causing the coil 720 to be successively operated until the arms 730 reach the desired position corresponding to the contact of bank 725 deenergized by operation of the selected push button switch.

Assume next that a second unit of the apparatus contemplated by this invention is coupled in tandem with the first one, that is, the one coupled to the analyzer. Plug 26" of the second unit will be coupled with receptacle 126 of the first unit; plug 30" of the second unit will be coupled with receptacle 130 of the first; jack plug 140 of the first unit will be coupled with jack 142' of the second, plug 140 electrically contacting contact 143' of jack 142' and separating contact 143' from contact 144'; and a plurality of additional external circuits (not shown) will be coupled with each of the A, B, C and D sections of the second unit in the same manner as above described in connection with the first unit.

When the arms 730 of the first unit reach their position engaging contacts e of banks 721 et seq., a circuit is completed from positive pin h of plug 30' of the first unit, through conductors 138, 811 and 812, closed jack contacts 144 and 143 of the first unit (it being noted that there is no necessity for the jack 142 on the first unit except to render it interchangeable with other units for use in other than the position adjacent the analyzer in a tandem arrangement), conductors 831 and 828, arm 730 of bank 724 (or 722 or 723), contact 724e (or 722e or 723e), conductors 833 and 834, still closed relay contacts 704e and 704f, conductor 851, series contacts f and e of push button switches 780, 770, 760, 750 and 740, conductor 849, and jack plug 140 of the first unit to jack contact 143' of the first unit.

Connection of such voltage to jack contact 143' of the second unit supplies the power thereto required for initial indexing and operation of the second unit, the first unit remaining in its inactive or status quo condition with its arms 730 on the bank contacts e of its banks 721 et seq., in order to continue supplying power to the second unit through jack plug 140.

The operation of the second unit with respect to external circuits coupled therewith will be the very same as described for the first unit, except that all positive power taken by the first unit from pin h of its plug 30' is taken by the second unit from jack contact 143' of its jack 142'. The manner in which the external circuits coupled to the second unit are coupled through conductors 101–111 inclusive and 113–123 inclusive of the first unit will be apparent. Similarly, it will be evident how conductor 112 of the first unit feeds through receptacle 126 and plug 26" to the second unit, and how conductor 124 of the first unit is effectively coupled to conductor 125 thereof, and thus pin 24 of plug 28" of the second unit, by a circuit traceable in the first unit from conductor 124, through closed contacts 701a and 701b associated with deenergized relay coil 711, conductors 822 and 821, arm 730 of bank 721, bank contact 721e, and conductor 125 to terminal 24 of receptacle 128.

It should also now be apparent that any number of units made in accordance with this invention can be successively coupled in tandem in the manner indicated to provide for any desired number of external circuits to be tested.

One feature of the apparatus meriting further mention is the fact that by providing for the commoning of all external circuits coupled with sections other than the section whose circuits are at the time under test, with an analyzer of the preferred type which itself tests for inter-circuit shorts or leakage between all circuits in the same group (or section) undergoing testing, the overall arrangement including the apparatus contemplated by this invention provides an effective test for shorts or excessive leakage between any circuit of any section to be tested and all other circuits of both that section and all other sections connected to unit or units of apparatus used with the analyzer.

It should also be observed that the present invention, through the provision of the multiple circuit testing control switch 600, provides for the application of multiple circuit testing techniques made possible by the improved analyzer disclosed in my said co-pending application, not only to the basic plurality of circuits which the analyzer is alone capable of testing, but also to all circuits which may be coupled with the analyzer through the multiplier apparatus of this invention. For a back-ground concerning the various considerations involved in "multiple circuit" testing, reference is made to my said co-pending application.

When the multiple circuit testing control switch 600 is in the position illustrated in Fig. 1C, wherein pole pieces 630, 640, 650 and 660 respectively engage conductors 631, 641, 651 and 661 the multiplier apparatus of this invention is so arranged that multiple circuit testing action of the analyzer will take place with multiple circuits referred back to only the first plurality of multiple circuit test positions for which the analyzer is itself initially adapted. With the switch 600 in this "normal" position the circuitry associated with relay switches 501C, 502C, 503C and 504C is exactly comparable to that provided in sections A, B and D. When the knob 601 is mainipulated to actuate switch 600 into the alternate position, wherein poles 830, 840, 850 and 860 respectively engage conductors 832, 842, 852, and 862, however, it will be seen that the grounding switches 501C, 502C, 503C and 504C are effectively removed from the circuitry so that what might otherwise be detected by the analyzer as a short between any two or more of the conductors 101, 102, 103 and 104 would not have that effect, in view of the fact that none of said conductors 101, 102, 103 and 104 are coupled to the common lead 535 when testing is being done in the section C circuits. The showing in this respect is intended to be illustrative only and in other embodiments might be either diminished or extended, as desired. It will be clear, however, that the provision of such a switch 600 in essence permits multiple circuit testing operation by the analyzer in manner by which the multiple circuit testing techniques disclosed in my said co-pending application may be adapted or referred to all of the circuits whose testing is made possible by the use of the multiplier apparatus contemplated by this invention.

It will now be clear that this invention manifestly accomplishes all of the above-mentioned and other objects desired to be attained in connection with equipment of the type in question. It will also be evident, however, that many minor modifications and changes might be made without departing from the true spirit or intention of the invention. Accordingly, it is to be understood that the invention shall be deemed limited only by the scope of the appended claims.

Having thus described the invention, what is claimed as new and desired to be secured by Letters Patent is:

1. For use with a circuit analyzer adapted for successively testing a large but limited plurality of external circuits and of the kind provided with a first group of connecting means adapted for respective coupling with one end of each of said limited plurality of circuits, a second group of connecting means adapted for respective coupling with the other end of each of said limited plurality of circuits, electrical power means, electrical testing means for determining characteristics of a circuit to which power is applied, and switching means for cyclically coupling said power means and said testing means successively with each corresponding pair of said first and second connecting means to successively energize and test each of said limited plurality of circuits, apparatus for substantially increasing the number of external circuits that may be tested by the analyzer without modification of the latter by repetitive coupling of different limited pluralities of circuits with said connecting means, said apparatus comprising: a first group of connecting structures adapted for respective coupling with said first group of connecting means of the analyzer; a second group of connecting structures adapted for respective coupling with said second group of connecting means of the analyzer; a first set of connecting devices, including at least one device for each of said first group of connecting structures and a plurality of devices for at least some of said second group of connecting structures, a number of said devices of said first set greater than said limited plurality being adapted for coupling with one end of an external circuit to be tested; a second set of connecting devices, including at least one device for each of said first group of connecting structures and a plurality of devices for at least some of said second group of connecting structures, a number of said devices of said second set greater than said limited plurality being adapted for coupling respectively with the other ends of said external circuits with which said devices of said first set are adapted to be coupled; and switching circuit mechanism for successively and alternately connecting different portions of said first set of devices with said first group of connecting structures and corresponding portions of said second set of devices with said second group of connecting structures.

2. In an apparatus as set forth in claim 1, wherein said apparatus is provided with a third group of connecting structures adapted for coupling with the first group of connecting structures of a second apparatus of the kind defined connected in tandem with the defined apparatus; a fourth group of connecting structures adapted for coupling with the second group of connecting structures of said second apparatus; and conductive means coupling said structures of said first group thereof with said structures of said third group thereof and said structures of said second group thereof with said structures of said fourth group thereof.

3. In an apparatus as set forth in claim 1, wherein said switching circuit mechanism includes control means coupled with a last of said structures of one group thereof and responsive to electrical power applied to the latter for actuating the mechanism to disconnect one portion of said first and second sets of devices from said first and second groups of structures and to connect a succeeding portion of said first and second sets of devices with said first and second groups of structures.

4. In an apparatus as set forth in claim 1, wherein is provided switching circuit equipment for connecting all other portions of said first set of devices to a last of said first group of structures when one portion of said first set of devices is connected with the remaining ones of said first group of connecting structures by said switching circuit mechanism.

5. In an apparatus as set forth in claim 4, wherein said switching circuit equipment is coupled with a last of said second group of structures and responsive to electrical power applied to the latter.

References Cited in the file of this patent

UNITED STATES PATENTS 2,329,491    Sulzer _____ Sept. 14, 1943